United States Patent
Seiler et al.

(10) Patent No.: US 8,954,016 B2
(45) Date of Patent: Feb. 10, 2015

(54) METHOD FOR ENABLING PROMPT DIAGNOSIS OF A FIELD DEVICE CONNECTED TO A WIRELESS ADAPTER

(75) Inventors: Christian Seiler, Auggen (DE); Marc Fiedler, Reinach (CH); Stefan Probst, Weil am Rhein (DE); Werner Thoren, Steinen (DE)

(73) Assignee: Endress + Hauser Process Solutions AG, Reinach (CH)

( * ) Notice: Subject to any disclaimer, the term of this patent is extended or adjusted under 35 U.S.C. 154(b) by 119 days.

(21) Appl. No.: 13/878,018

(22) PCT Filed: Aug. 25, 2011

(86) PCT No.: PCT/EP2011/064655
§ 371 (c)(1),
(2), (4) Date: Apr. 5, 2013

(87) PCT Pub. No.: WO2012/045521
PCT Pub. Date: Apr. 12, 2012

(65) Prior Publication Data
US 2013/0203359 A1  Aug. 8, 2013

(30) Foreign Application Priority Data
Oct. 7, 2010 (DE) .......................... 10 2010 042 116

(51) Int. Cl.
*H04B 17/00* (2006.01)
*H04B 7/26* (2006.01)
*H04Q 9/00* (2006.01)

(52) U.S. Cl.
CPC .. *H04B 7/26* (2013.01); *H04Q 9/00* (2013.01); *H04Q 2209/43* (2013.01); *H04Q 2209/883* (2013.01)
USPC ....... 455/67.11; 455/67.13; 455/9; 340/853.2

(58) Field of Classification Search
CPC ........ H04B 1/03; H04B 1/3827; H04B 3/542; H04B 7/26
USPC ...................... 455/67.11, 67.13, 9, 10, 115.1; 340/853.2, 3.1, 3.9
See application file for complete search history.

(56) References Cited

U.S. PATENT DOCUMENTS 7,027,808 B2 * 4/2006 Wesby ........................... 455/419
7,532,571 B1 * 5/2009 Price et al. ..................... 370/225

(Continued)

FOREIGN PATENT DOCUMENTS

DE    19933924 A1    11/2000
DE    10209328 A1    9/2003

(Continued)

OTHER PUBLICATIONS

English translation of IPR, WIPO, Geneva, Apr. 18, 2013.

(Continued)

*Primary Examiner* — Minh D Dao
(74) *Attorney, Agent, or Firm* — Bacon & Thomas, PLLC

(57) ABSTRACT

A method, in the case of which it is monitored in a wireless adapter connected to a field device whether, in the context of communication with the field device, a status change of the field device is being reported. In case a status change has been reported, the wireless adapter queries for expanded status information of the field device. The expanded status information is transmitted event-controlled from the wireless adapter to a superordinated communication unit and provided through such to an evaluation tool, in case a comparison of the expanded status information with a status pattern adapted specifically for the field device shows that the relevant, expanded status information should be evaluated.

15 Claims, 2 Drawing Sheets

(56) References Cited

U.S. PATENT DOCUMENTS

Figure 1:
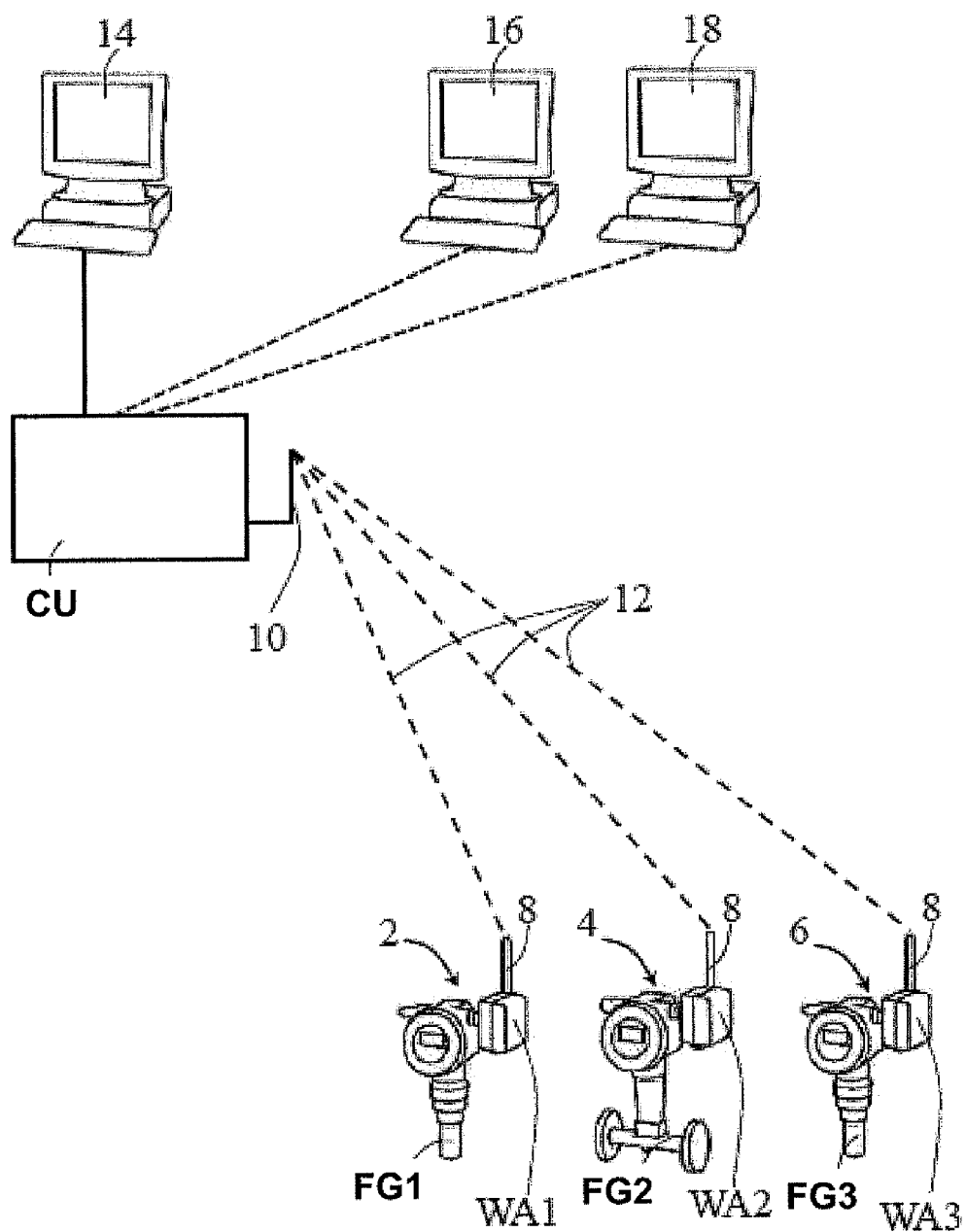

| | | | |
|---|---|---|---|
| 7,558,564 B2 * | 7/2009 | Wesby | 455/419 |
| 7,747,018 B2 * | 6/2010 | Marino | 380/262 |
| 7,805,134 B2 * | 9/2010 | Mirza-Baig | 455/418 |
| 8,037,218 B2 * | 10/2011 | Fujii et al. | 710/38 |
| 8,063,762 B2 * | 11/2011 | Sid | 340/506 |
| 2007/0287389 A1 * | 12/2007 | Pockat et al. | 455/73 |
| 2008/0123582 A1 * | 5/2008 | Maekawa | 370/315 |
| 2008/0248794 A1 * | 10/2008 | Mirza-Baig | 455/423 |
| 2008/0278332 A1 * | 11/2008 | Fennell et al. | 340/573.1 |
| 2009/0207017 A1 | 8/2009 | Erickson | |
| 2012/0178496 A1 * | 7/2012 | Hwang et al. | 455/550.1 |
| 2014/0171032 A1 * | 6/2014 | Huang et al. | 455/414.1 |

FOREIGN PATENT DOCUMENTS

| | | |
|---|---|---|
| WO | WO 2005/103851 | 11/2005 |
| WO | WO 2008/127657 A1 | 10/2008 |

OTHER PUBLICATIONS

German Search Report, Jun. 17, 2011, Munich.
International Search Report, Nov. 9, 2011, The Netherlands.

* cited by examiner

METHOD FOR ENABLING PROMPT DIAGNOSIS OF A FIELD DEVICE CONNECTED TO A WIRELESS ADAPTER

TECHNICAL FEILD

The present invention relates to a method for operating a system having a field device, a wireless adapter in wired communication connection with the field device, and a superordinated communication unit, which with the wireless adapter is in wireless communication connection.

BACKGROUND DISCUSSION

In process automation technology, field devices are often applied, which serve for registering and/or influencing process variables. Serving for registering process variables are sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, and conductivity. Serving for influencing process variables are actuators, such as e.g. valves or pumps, via which the flow of a liquid in a pipeline section, or the fill level in a container, can be changed. A large number of such field devices are produced and sold by the firm, Endress+Hauser.

In modern industrial plants, field devices are often connected via bus systems (Profibus®, Foundation® Fieldbus, HART®, etc.) with a process control unit, which performs process control using the field devices associated with it. Besides wired communication, there is, both within a fieldbus system as well as also detached from such, the opportunity for wireless communication (e.g. communication via radio). For implementing wireless communication, newer field devices can be embodied as radio field devices. Along with that, there is the opportunity of enabling wireless communication for data of a field device by connecting to the relevant field device a wireless adapter, which has a radio unit. For example, a wireless adapter is described in WO 2005/103851 A1.

Additionally or alternatively to using a wireless adapter to enable the connecting of a field device to a wireless fieldbus, there is, furthermore, the opportunity of using a wireless adapter, in order to transmit data relative to the field device wirelessly to a corresponding communication unit, which is formed, for example, by a host. This transmission can occur especially via a long distance transmission network. In this way, for example, regularly, inventory data, which are formed e.g. by measured values of the respective field device, can be transmitted to the communication unit and managed there. For this, especially a corresponding server is implemented in the communication unit. A typical application could be, for example, that the wireless adapter, at first, predetermined times, queries measured values from the field device connected thereto. The queried measured values are, in given cases, collected in the wireless adapter. They are, at second, predetermined times, transmitted wirelessly to the communication unit. The time separation between the second, predetermined times is, especially when the measured values are collected, clearly greater than the time separation between the first, predetermined times. For example, the collected data might be transmitted to the communication unit only once a day.

Often, there is the need to operate the unit formed of field device and thereto connected wireless adapter as an autarkic unit. In this case, the field device is supplied with electric power by the wireless adapter. In order to prevent an unnecessary loading of the electrical current supply unit (e.g. single-use battery, rechargeable battery, etc.) of the wireless adapter, the wireless adapter is switched off, especially at times, when it is not communicating (especially at times other than the first and second, predetermined times). Also, the field device is supplied with electric power by the wireless adapter and turned on only when a communication with the wireless adapter is to be performed. This sporadic turning off of the wireless adapter (and also of the field device) leads, however, to a considerable time delay in the case of analysis (respectively, diagnosis) and, in given cases, in the case of error removal, in case a status change, especially an error, occurs in the field device.

A status change of the field device is reported by the field device, as a rule, (depending on fieldbus protocol) by a status, basic information report. The status, basic information report is, for example, transmitted to the wireless adapter together with a measured value of the field device. Apart therefrom, that in the field device a status change has occurred, the wireless adapter has, as a rule, no other information. As a rule, especially the collection of data continues. In the case of the transmission of the data relative to the field device to the communication unit (which occurs, for example, at the second, predetermined times) it can be provided that, in such case, also the information is included, that a status change has occurred in the field device. The communication unit is, in this way, however, informed first relatively late concerning the status change. If, for example, an error has occurred in the field device, so that the provided measured values are no longer valid and thus invalid measured values were collected by the wireless adapter over a considerable length of time. Also, is in the case of the discussed manner of operation, an analysis of the status change (diagnosis of the field device) and, in given cases, an error removal via the communication unit, especially by an application (for example, a configuration tool) accessing the communication unit, is made difficult. An accessing of the wireless adapter and, in given cases, a retrieval of additional status information from the field device, as well as, in given cases, a change of parameter settings of the field device, are made especially difficult by the fact that the wireless adapter, at times when no planned transmission of data relative to the field device takes place, is not available for communication with the communication unit. In this way, an analysis and/or error removal to be performed via the communication unit can experience a delay until the next, planned transmission of data between the wireless adapter and the communication unit. The delay can be up to a day or even longer. Furthermore, it is problematic that, in the case of a reported status change of the field device, there is not in each case a more extensive analysis and/or error removal performed. For evaluating whether, in the case of the given status of the field device, more extensive steps, such as, for example, an analysis, an error removal, etc., are required, device specific knowledge is required.

SUMMARRY OF THE INVENTION

Accordingly, it is an object of the present invention to provide a method, which, in the case of a status change of a field device connected to a wireless adapter, enables a prompt and effective analysis (respectively, diagnosis) and simultaneously a low energy consumption of the unit formed of the wireless adapter and the field device. The object includes, furthermore, the providing of a correspondingly formed wireless adapter.

The object is achieved by a method as well as by a wireless adapter.

In the present invention, a method is provided for operating a system, which includes a field device, a wireless adapter in wired communication connection with the field device, and a superordinated communication unit, which is in wireless communication connection with the wireless adapter. The method includes, in such case, steps as follows:

A) monitoring in the wireless adapter whether, in the context of communication with the field device, a status change of the field device is being reported;

B) event controlled querying of expanded status information of the field device by the wireless adapter, in case a status change has been reported; and C) event controlled transmitting of the expanded status information from the wireless adapter to the superordinated communication unit and providing this expanded status information through the superordinated communication unit to an evaluation tool only when comparison of the expanded status information with a status pattern specifically adapted for this field device shows that the relevant, expanded status information should be evaluated, wherein the comparison is performed in a communication unit participating in the communication between the wireless adapter and the superordinated communication unit.

Because the wireless adapter queries the field device directly for expanded status information when a status change of the field device has been reported, the wireless adapter has, without mentionable delay, more extensive information relative to the status of the field device. Since a comparison of the expanded status information is performed with a status pattern adapted specifically for the field device in question, it can, in simple manner, be detected whether a more extensive evaluation is required or not. For the performing the comparison, the communication unit in question requires no extensive, specific device knowledge relative to the respective field device. Especially, it requires no information for device integration of the field device, which would require significantly higher processor power and more memory capacity. The status pattern can be embodied simply, so that its storage requires little memory capacity and performing the comparison requires only a low processor power. Accordingly, the system components (field device, wireless adapter) installed in the field can be designed leanly as regards processor power and memory capacity. A providing of expanded status information to an evaluation tool occurs according to the present invention only when the comparison performed shows that the relevant, expanded status information should be evaluated. In this way, unnecessary communication (in the context of analysis and/or error removal) and therewith unnecessary energy consumption by the unit composed of field device and wireless adapter can be prevented. At the same time, the method of the invention assures that, in the case of a status change, in the case of which an evaluation is required, the expanded status information, which characterizes the current status of the field device more thoroughly (than the basic status information), is transmitted promptly to the superordinated communication unit and provided to an evaluation tool (for evaluation of such).

In the case of step C), the expanded status information is only provided to the evaluation tool when the comparison performed shows that the expanded status information should be evaluated. If, in contrast, the comparison shows that the expanded status information need not be evaluated, then, in the case of step C), the step of event controlled transmitting and/or of the providing is/are not performed. At which position of the communication path from the wireless adapter to the superordinated communication unit the forwarding of the expanded status information is interrupted, depends especially on which position along this communication path the comparison is performed.

The terminology "field device" means here especially a sensor and/or an actuator. The method of the invention is especially advantageous when the field device is formed by a sensor. The field device can, in such case, be embodied especially as a 2-conductor device (electrical current supply and communication occur via a shared 2-conductor connection) or as a 4-conductor device (electrical current supply occurs via a 2-conductor connection and communication occurs via a separate 2-conductor connection). The communication via the wired communication connection occurs especially according to a fieldbus protocol (e.g. HART®, Foundation® Fieldbus, Profibus®, manufacturer-specific fieldbusprotocol, etc.).

The "wireless adapter" is a device, which 1) is connectable to (exactly) one field device, which 2) is, in each case, embodied separately from the relevant field device, through which 3) (via a wired communication interface of the wireless adapter) a wired communication is performable with the field device, and which 4) has a wireless communication interface (respectively, radio interface) for performing wireless communication. The wireless adapter is especially connectable releasably to the particular field device. Especially, data relative to the field device are transmissible wirelessly by the wireless adapter. Accordingly, with a wireless adapter, a conventional field device can be upgraded to a radio field device. In such case, it is not absolutely necessary that all communication for the field device be performed wirelessly by the wireless adapter. As above explained, through a wireless adapter, especially, a field device can be connected to a wireless fieldbus. Alternatively, the communication via the fieldbus can (e.g. in the context of process control), however, also occur by wire. Furthermore, there is in both cases the opportunity to use a wireless adapter, in order to transmit data relative to the field device wirelessly to a corresponding communication unit, which is formed, for example, by a host. Especially, the wireless adapter can query for data relative to the field device via the wired communication connection. It can transmit this data directly or delayed in time, for example, after it has collected data over a certain length of time, wirelessly to the superordinated communication unit. In reverse manner, also data relative to the field device (for example, parameter settings to be undertaken, etc.) can be transmitted from the superordinated communication unit wirelessly to the wireless adapter and from there, in turn, by wire to the field device.

The "superordinated communication unit" can perform wireless communication with the wireless adapter. Along with that, it can also perform other functions. Especially, the superordinated communication unit can, as is explained below, be embodied as a host, in which a corresponding server is implemented. Furthermore, there can be implemented in the superordinated communication unit also other applications, or programs, such as, for example, an evaluation tool, a configuration tool, etc. Just because the superordinated communication unit is in wireless communication connection with the wireless adapter, that does not absolutely require that the entire communication path extend wirelessly. Rather, it can also be provided that a part of the communication path is wired and/or that along the communication path between the wireless adapter and the superordinated communication unit one or a number of other communication units participate in the communication.

In fieldbus systems, it is, as a rule, provided that status changes of a field device are reported. The report of a status change occurs, as a rule, through the transmission of basic status information (alternative references to this include: "error flag", "error bit", "status bit" or "status byte"), and this can occur, for example, together with the transmission of a measured value (a sensor) or together with the confirmation of a received actuation command (in the case an actuator). For example, the basic status information can be formed by "GOOD", "UNCERTAIN" and "BAD". Further information relative to the status of the field device and/or relative to an error, which has arisen in the field device, cannot be obtained from the report of the status change of the field device (compare step A)). Such more extensive information can be obtained by the retrieval of expanded status information performed in step B). This expanded status information is sometimes also referred to as diagnostic information or error information. In the case of the HART® fieldbus protocol, expanded status information can be queried with a query telegram with command 48. For evaluating the expanded status information, device specific knowledge, especially information for device integration of the respective field device, is required.

The terminology "event controlled" querying and a "event controlled" transmitting means that such is triggered by a corresponding event and occurs directly (i.e. with no or only little time delay). In the case of step B), in such case, the triggering event is the establishing of the fact that a status change of the field device has been reported. In the case of step C), the step of transmitting is performed, again, as directly as possible after obtaining the expanded status information from the wireless adapter. Accordingly, the steps of querying (compare step B)) and of transmitting (compare step C)) are performed independently of planned or cyclic communication. Especially, the transmission from the wireless adapter to the superordinated communication unit can occur in an event mode or in a burst mode.

The evaluation tool is an application (respectively, a program), by which expanded status information of the respective field device is evaluatable. Along with that, an evaluation tool can have other functions. Especially, it can be formed as a diagnostic tool, by which a diagnosis of the associated field device can be presented and displayed to a user, as a configuration tool, by which, besides the creation of a diagnosis, also servicing functionalities are performable with reference to the associated field device, and/or as an asset management system. Furthermore, it can be provided that the evaluation tool executes the relevant functions not only in reference to a belonging field device but, instead, in reference to a number of field devices, especially a number of field devices of different field device type. For performance of these functions, it can especially access information concerning device integration of the respective field device. The evaluation tool can, in such case, be implemented directly in the superordinated communication unit. Alternatively, it can also be implemented in a separate communication unit, which is, or is temporarily placeable, in communication connection with the superordinated communication unit. The terminology "providing the expanded status information" (compare step C)) to the evaluation tool means both a transmitting to the evaluation tool as well as also a making of the information available for query.

That the status pattern is adapted specifically for the field device in question means that it can be adapted especially specifically for the respective field device type and/or specifically for the particular instance (i.e. for the respectively set, operational manner and/or the respective use conditions of the field device). The communication unit, in which the comparison is performed, can especially be formed by the wireless adapter, by the superordinated communication unit or even by another communication unit, which participates in the communication between the wireless adapter and the superordinated communication unit.

In a further development, it is determined in the status pattern for the different pieces of expanded status information providable by the associated field device, in each case, whether such should be evaluated or not. In creating the status pattern, only the different pieces of expanded status information providable by the field device, must be taken into consideration and combined, in each case, with the associated information, whether these are to be evaluated or not. A so embodied status pattern can easily be created.

In a further development, the information required for a configuration tool for creation of a status pattern associated with the field device are contained in information for device integration of the field device, especially in a device description and/or in a device driver of the field device. Accordingly, a user can let the status pattern associated with a field device be created simply by a configuration tool, without having to use further, device specific knowledge for this. The field device type specific special features are taken into consideration automatically by the configuration tool by uses the information for device integration of the relevant field device. If it is supplementally desired that the status pattern be adapted instance-specifically, then, in given cases, it can supplementally be provided that the user via the configuration tool performs corresponding adaptations in creating the status pattern. The information for creating the status pattern, or corresponding functionalities, can so largely be provided in the information for device integration of the field device that the configuration tool does not required special or, in given cases, only small, adaptations for creating a corresponding status pattern. After its creation, the status pattern can then be imported into the communication unit, in which the comparison is performed, and stored there. The communication unit in question then accesses the status pattern of the associated field device for performing the comparison.

The configuration tool is a program (respectively, an application) applied for servicing and configuring field devices. Especially, such a configuration tool can read and write parameters of the field device. Furthermore, a configuration tool provides a suitable user interface, via which a user can read and/or write parameters of the field device. Furthermore, configuration tool can be used to create a diagnosis of the field device. For this, it can especially evaluate the expanded status information as well as, in given cases, additional information obtained via particular diagnostic queries. Additionally, the configuration tool can perform yet other functions. An example of a configuration tool is the FieldCare® product of the firm, Endress+Hauser.

Since the information for creating a status pattern associated with the field device is contained in information for device integration of the field device, the configuration tool requires no field device type-specific knowledge, in order to create the status pattern associated with the respective field device. Device information is generally applied, in order to be able to service different field devices, especially field devices of different manufacturers, via one and the same configuration tool. Information for device integration of a field device is used for making known to the respective configuration tool the properties, functions and information of the relevant field device needed for servicing. For this, standards have been developed in reference to information for device integration. On the one hand, information for device integration of a field device comprises, for example, a device description (DD) of the field device. The device description is, as a rule, created in the form of text (e.g. in the ASCII text format). For this, depending on applied fieldbus system, different device description languages are used. The information provided in the device description is, as a rule, interpreted, respectively translated, by an interpreter and provided to the configuration tool, which forms a frame application for the device description. Furthermore, information for device integration of a field device comprises, for example, a device driver of the field device, especially a "Device Type Manager" (DTM). A device driver, especially a "Device Type Manager", is, in such case, a device-specific software, which encapsulates data and functions of the field device and provides graphical servicing elements. Such a device driver requires a corresponding frame application for execution. For example, a "Device Type Manager" requires for execution an "FDT frame application" (FDT: Field Device Tool). The configuration tool "Field-Care®" of Endress+Hauser forms such a FDT-frame application.

In a further development, the expanded status information is provided by the field device in the form of a status information bitmap. In such case, the occupation of the bit locations of the status information bitmap determines the content of the expanded status information transmitted, in each case. Furthermore, the status pattern is formed by a corresponding pattern bitmap and, in the case of the comparison (compare step C)), the status information bitmap is compared with the pattern bitmap. A bitmap achieves an especially simple representation of the respective, expanded status information as well as the status pattern. The terminology "bitmap" means especially a data structure, which is formed of a sequence of individual bits (alternative name: bit array). The individual bits of the bitmap can, in such case, also be grouped in words, especially in bytes. For example, an embodiment can be created in such a manner that the status information bitmap for representing the expanded status information has a predetermined length (bit position number). Furthermore, it can be provided that each piece of expanded status information providable by the field device is associated with a particular occupation of the bit locations of the status information bitmap. The pattern bitmap is especially embodied in such a manner that it has the same length (i.e. the same bit position number) as the status information bitmap. The occupation of the bit locations of the pattern bitmap can especially be selected in such a manner that only such expanded status information needs to be evaluated, in the case of which the bit locations occupied in the associated status information bitmap by a "1" are also occupied in the pattern bitmap by a "1". Whether a respectively required agreement is present can be detected by a bit position wise comparison of the status information bitmap with the pattern bitmap.

In a further development, the field device is supplied by the wireless adapter with electric power. In this way, the unit formed of the field device and the wireless adapter can be autarkically operated. This is especially advantageous in the case of exposed, difficultly accessible and/or extreme conditions facing, locations of use. In a further development, the wireless adapter includes an autarkic electrical current source, especially a single-use battery, a rechargeable battery and/or a solar cell.

In a further development, in normal operation, communication between the field device and the wireless adapter is performed at first, predetermined times. Furthermore, transmission of data relative to the field device between the wireless adapter and the superordinated communication unit is performed wirelessly at second, predetermined times. In such case, the wireless adapter is, in normal operation, switched off at times when it is performing no communication. Especially, it is provided that the time intervals between the first predetermined times are shorter, for example, shorter by a whole numbered multiple, than the time intervals between the second, predetermined times. This further development relates especially to an application, in which the wireless adapter collects data relative to the field device and then transmits such collected data to the superordinated communication unit. Since the wireless adapter is switched off at times when it is not performing communication, unnecessary energy consumption is prevented. Also, it is preferably provided that the wireless adapter turns the field device on and supplies it with voltage for performing communication and, after termination of the communication, turns it back off and separates it from the voltage supply. Since, according to the present invention, the steps of querying (compare step B)) and transmitting as well as providing (compare step C)) are performed under event control, the wireless adapter, is also turned on upon occurrence of a corresponding event outside of the planned time periods, so that prompt analysis and, in given cases, fast error removal are provided.

In a further development, the wireless adapter, after the step of transmitting the expanded status information (compare step C)), for a predetermined length of time remains at least sufficiently activated that communication with the same is initiable by the superordinated communication unit. This further development provides the opportunity that, after obtaining the expanded status information, the superordinated communication unit can access the wireless adapter and, from there, the field device. Such accessing can occur, for example, in order to obtain more extensive status information, which can be requested, for example, by way of a particular diagnostic querying (for example, using a diagnostic tool or a configuration tool), and/or in order to be able to perform an adjusting of parameters of the field device. In a further development, it is provided that the wireless adapter is operated in an energy saving mode during the predetermined length of time. This can especially be a standby mode with low energy consumption or, in given cases, a mode, in which the wireless communication interface is only operated by clocking. Furthermore, according to an additional development, it is provided that stored in the wireless adapter are service times, at which personnel for performing analysis, or diagnosis of and/or an error removal are reachable. In such case, it can be provided that, outside of service times, the wireless adapter turns directly off after the transmission of the expanded status information (compare step C)), while, within service times, it remains activated. If transmission of the expanded status information occurs outside of service times, then it can be provided that, in given cases, the wireless adapter transmits within the service times a corresponding report to the superordinated communication unit.

In a further development, the following step is performed, especially after the step of transmitting the expanded status information (compare step C)): Providing a transparent communication channel from the superordinated communication unit via the wireless adapter to the field device, so that via the transparent communication channel communication is performable directly with the field device. In this way, an accessing application (e.g. a configuration tool, a diagnostic tool, an asset-management-system, etc.) in the superordinated communication unit can communicate directly with the field device. Especially, it is not required that, in each case, a separate communication occurs between the superordinated communication unit and the wireless adapter as well as between the wireless adapter and the field device according to the respective communication protocol and at the, in each case, allowable times. Especially, it can be provided that the communication via the transparent communication channel occurs according to a fieldbus protocol (HART®, Profibus®, Foundation® Fieldbus, manufacturer-specific fieldbus protocol), according to which communication is performable by the field device in question. For example, a configuration tool can via the transparent communication channel according to the respective fieldbus protocol required for the particular analysis, or diagnosis, query for particular status information of the field device and/or make parameter settings on the field device in the context of an error removal.

In a further development, the superordinated communication unit, after obtaining the expanded status information, performs the following step: Transmitting a report to the evaluation tool, by which expanded status information of the field device is evaluatable. Through such a report (e.g. an alarm), the evaluation tool can be informed that expanded status information of the field device is available (for example, it can be queried).

In a further development, the evaluation tool is embodied in such a manner that it applies information for device integration of the field device, especially a device description and/or a device driver of the field device, in order to evaluate expanded status information of the field device. By applying information for device integration of the field device, the evaluation tool needs no further device specific knowledge concerning the respective field device. Especially, it can be provided that the evaluation tool can access information for device integration of a plurality of field devices. In this way, the evaluation tool can exert evaluating functionality (and, in given cases, still other functionalities) with reference to a plurality of field devices.

In a further development, the comparison is performed in the wireless adapter. Especially, the status pattern is stored in the wireless adapter. In this further development, since a first evaluating of the expanded status information in the form of the comparison takes place already at a very early location in the communication path from the field device to the superordinated communication unit (and, in given cases, an evaluation tool accessing the superordinated communication unit), superfluous communication is avoided. This is also advantageous as regards an as low as possible energy consumption of the communication units participating in the communication. Furthermore, the superordinated communication unit is not being used unnecessarily, since an event controlled transmitting of the expanded status information from the wireless adapter to the superordinated communication unit (compare step C)) is especially only performed when the comparison in the wireless adapter shows that the relevant, expanded status information should be evaluated.

In a further development, the comparison is performed in the superordinated communication unit. In the case of this further development, it is especially provided that the wireless adapter, after the step of querying (compare step B)), always also performs the step of event controlled transmitting (compare step C)). The superordinated communication unit provides the expanded status information, however, only to the evaluation tool, when the, comparison performed in the superordinated communication unit shows that the relevant, expanded status information should be evaluated.

In a further development, the wireless communication connection between wireless adapter and superordinated communication unit extends at least partially via a wireless long distance transmission network. Such wireless long distance transmission network can especially enable worldwide wireless communication between the superordinated communication unit and the respective wireless adapter. In this way, the superordinated communication unit can execute corresponding services with reference to wireless adapters, which are distributed worldwide. The wireless long distance transmission network can especially be formed by a GSM network (GSM: Global System for Mobile), by a UMTS network (UMTS: Universal Mobile Telecommunication System), etc. If the superordinated communication unit, however, only performs services with reference to wireless adapters, which are arranged in the local environment of the superordinated communication unit, then the wireless communication can also occur alternatively only via a local, wireless communication network. Especially, the wireless communication network can be embodied according to the wireless HART® standard or according to the ISA100 standard, which, in each case, build on the standard, IEEE 802.15.4.

In a further development, there is implemented in the superordinated communication unit a server, by which data relative to a plurality of field devices, especially a plurality of field devices of different users, are manageable and providable with corresponding applications (respectively, programs). Especially, such data can be transmitted to the respective applications and/or be queryable for such applications. The respective applications accessing the superordinated communication unit, such as, for example, an evaluation tool, a diagnostic tool, a configuration tool and/or an asset management system, can, in such case, be directly implemented in the superordinated communication unit. Alternatively, they can, however, also be implemented in a separate communication unit and stand in communication connection (e.g. via the Internet, etc.), at least at times, with the superordinated communication unit. The superordinated communication unit can especially provide a protected access (for example, by a password protected) for the particular application. Furthermore, the server of the superordinated communication unit can provide only data specifically selected for the particular application and/or specifically for the respective user. The managing of data can comprise especially a storing, archiving, monitoring, processing and/or providing of the data (in given cases, further processed data). Along with that, the server can also perform yet other functions and/or services. Such additional functions can comprise, for example, a reporting to the respective applications in the case of the presence of certain conditions.

The present invention relates, furthermore, to a wireless adapter, to which (exactly) one field device is connectable and bringable into wired communication connection therewith. In such case, wireless communication is performable by the wireless adapter. An electronics of the wireless adapter is embodied in such a manner that, in use, it can be monitored whether, in the context of communication with the connected field device, a status change of the field device is being reported, that, in case a status change has been reported, expanded status information can be queried event-controlled from the connected field device are, that a comparison of the expanded status information with a status pattern specifically adapted for the connected field device and storable in the wireless adapter can be performed and therefrom determined whether the relevant, expanded status information should be evaluated, and that the expanded status information is transmitted by the wireless adapter wirelessly to a communication unit in communication connection with the wireless adapter only when the comparison performed shows that the expanded status information should be evaluated. The wireless adapter of the invention achieves essentially the same advantages as explained above with reference to the method of the invention. Furthermore, the further developments explained above with reference to the method of the invention are implementable in corresponding manner in the case of the wireless adapter. Especially, in the case of method steps, to the extent that these are performable in the the wireless adapter, the electronics of the wireless adapter can be correspondingly adapted for performance of the respective steps. The "electronics" of the wireless adapter can be formed by hardware and/or software. Furthermore, it can work in analog and/or digital manner.

BRIEF SESCRIPTION OF THE DRAWINGS

Figure 2:
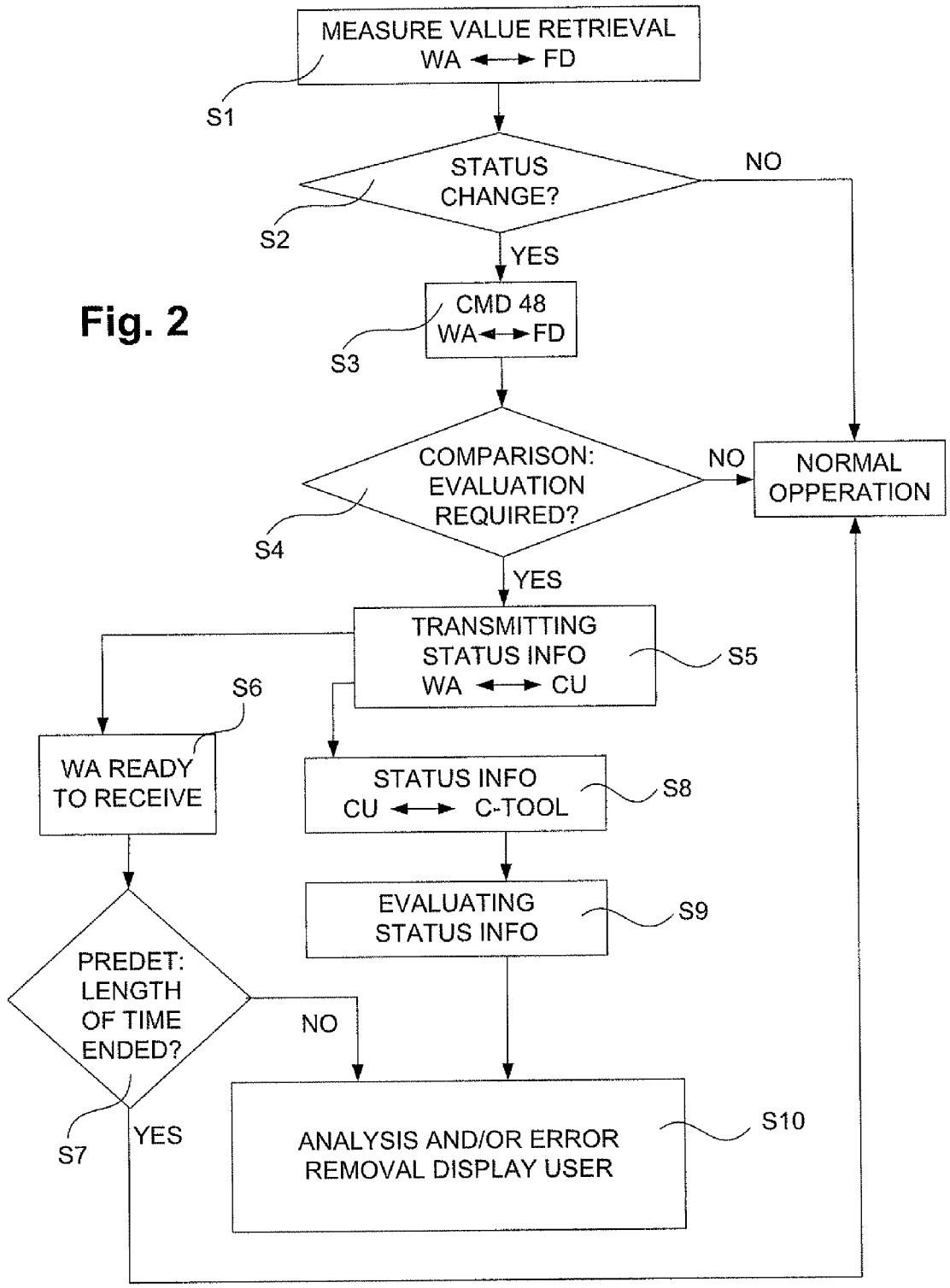

Other advantages and utilities of the invention will become apparent based on the description of examples of embodiments now to be presented with reference to the appended drawing, the figures of which show as follows:

FIG. 1 a system having a number of units each composed of field device and wireless adapter, a superordinated communication unit, and a number of tools accessing the superordinated communication unit; and FIG. 2 a flow diagram for illustrating a form of embodiment of the method of the invention.

DETAILED DISCUSSION IN CONJUCTION WITH THE DRAWINGS

FIG. 1 shows a system, in the case of which three field devices FD1, FD2 and FD3 are connected, in each case, to associated wireless adapters WA1, WA2 and WA 3. Field devices FD 1, FD 2 and FD 3 form, in each case, with the thereto connected wireless adapters WA1, WA2 and WA3 corresponding units 2, 4, 6 each composed of a field device and a wireless adapter. Each of the wireless adapters WA1, WA2 and WA 3 includes a radio unit 8. The wireless adapter WA1, WA2 and WA3 stand via a GSM-long distance transmission network in communication connection with a superordinated communication unit CU (compare dashed lines 12 in FIG. 1). FIG. 1 shows the superordinated communication unit CU likewise with a corresponding radio unit 10. In the case of long distance transmission networks, otherwise than shown in the schematic representation of FIG. 1, it is often provided that the superordinated communication unit CU is connected via an intermediate telecommunication network with the long distance transmission network (here: GSM long distance transmission network).

The units 2, 4, 6 composed of field device and wireless adapter can, in such case, be distributed worldwide. Along with that, also yet other units composed of field device and wireless adapter or radio field devices can stand in communication connection with the superordinated communication unit CU and the superordinated communication unit CU can, with reference to these, perform corresponding services, respectively functions. The field devices can be field devices of different users.

Implemented in the superordinated communication unit CU is a server, by which, in use, data relative to the associated field devices FD1, FD2 and FD 3 are manageable and providable to corresponding applications. The superordinated communication unit CU and the thereby provided services can be provided by an independent service provider, which especially is independent of the users of the individual field devices FD1, FD2 and FD3. Accessing the data, which are provided by the server of the superordinated communication unit CU, can be different applications, which are referred to below as tools. These tools are, in the case of the illustrated form of embodiment, in each case, implemented in communication units 14, 16 and 18 formed separately from the superordinated communication unit CU. In such case, the tools can be tools of different users. Especially, a tool of a certain user can via password protected access reach only data relative to the field devices, which belong to such user. Furthermore, it can be provided that other servers implemented on corresponding hosts (so-called hosting servers) access the superordinated communication unit CU, and then, in turn, provide corresponding services (e.g. corresponding tools) with reference to other end users. The field devices FD1, FD2 and FD3 can, supplementally to the wireless connections to the GSM-long distance transmission network, also be connected to a local fieldbus network. This connection to the local fieldbus network can occur wired or, alternatively, wirelessly, especially via the wireless adapter connected, in each case, to the field device.

In the following, a form of embodiment of the method of the invention and of the wireless adapter of the invention will now be explained. This explanation occurs with reference to the unit 2 composed of field device and wireless adapter. The communication unit 14 with the configuration tool is in the case of the present form of embodiment operated by the same user, in whose plant also the unit 2 composed of field device and wireless adapter is operated. Alternatively, it can be provided that the communication unit is operated by a service provider, which has been commissioned by the respective user (of the unit composed of field device and wireless adapter 2) to monitor the reliable operation of this unit 2 composed of field device and wireless adapter.

Field device FD1 is a measuring device, which registers a measured value. For example, field device FD1 can register a fill level in a container (not shown). In normal operation, the wireless adapter WA1 retrieves at first, predetermined times, such as, for example, every 2 hours, a measured value of the field device (compare "MEASURED VALUE RETRIEVAL WA<=>FD" at S1 in FIG. 2). These measured values, in normal operation, are collected in the wireless adapter WA1 and at second, predetermined times, such as, for example, once a day, transmitted wirelessly to the superordinated communication unit CU. Field device FD1 is supplied with electric power by the wireless adapter WA1. In normal operation, the wireless adapter WA1 is switched off at times when it is not communicating. The (wired) communication between the field device FD1 and the wireless adapter WA1 occurs in the case of the present form of embodiment according to the HART® protocol.

Wireless adapter WA1 monitors, in the context of communication with the field device FD1, whether a status change of the field device FD1 is being reported (compare "STATUS CHANGE?" in the case of step S2 in FIG. 2). For example, the status of the field device FD1 can change to "BAD". While in normal operation, the wireless adapter WA1 and the field device FD1 are switched off after transmission of the measured value to the wireless adapter, when a status change of the field device FD1 has been reported (compare "YES" in the case of step S2 in FIG. 2), the wireless adapter WA1 queries for expanded status information of the field device FD1. This querying occurs in the case of the present form of embodiment directly after establishing the occurrence of a status change. For querying the expanded status information, the wireless adapter WA1 transmits a query telegram with the command 48 defined in the HART® protocol (compare "HART® Field Communication Protocol Specifications, revision 7.0" obtainable from the HART® Communication Foundation). In response thereto, the field device FD1 transmits the expanded status information (compare "CMD 48 WA<=>FD" at step S3 in FIG. 2). If, in the step of monitoring, no status change of the field device is detected (compare "NO" at step S2 in FIG. 2), then the wireless adapter WA1 and the field device FD1 are operated further in normal operation (compare "NORMAL OPPERATION" at step SE in FIG. 2).

After obtaining the expanded status information, a comparison this expanded status information with a status pattern adapted specifically for the field device FD1 is performed in the wireless adapter WA1. As explained above, the expanded status information is provided in the form of a status information bitmap. The status information bitmap is, in such case, embodied in such a manner that associated with the different pieces of status information (respectively, error reports) is, in each case, a bit location in the status information bitmap. The occupation of a bit location with a "1" means, in such case, that the associated status information (respectively, error report) is present in the field device FD1. In contrast, the occupation of a bit location with a "0" means that the associated status information (respectively, error report) is not present in the field device FD1. The status pattern is formed by a corresponding pattern bitmap, which has the same length (the same bit position number) as the status information bitmap. The pattern bitmap is, in the case of the present form of embodiment, embodied in such a manner that there is associated with the different pieces of status information (respectively, error reports), in each case, the same bit location as in the case of the status information bitmap. The pattern bitmap is, furthermore, embodied in such a manner that a bit location of such is only occupied with a "1", when the associated status information (respectively, error report) is to be evaluated, while it is occupied with a "0", when the associated status information (respectively, error report) is not to be evaluated. Accordingly, status information reported in the status information bitmap (through occupation of the corresponding bit location by a "1") is only to be evaluated when the corresponding bit location in the pattern bitmap is also occupied by a "1". If is none of the bit location(s) occupied in the status information bitmap by a "1" has a "1" in the pattern bitmap, then the total, expanded status information is not to be evaluated. If only a part of the bit locations in the status information bitmap occupied by a "1" are occupied in the pattern bitmap by a "1", then only this part is to be evaluated.

As explained above, the pattern bitmap specific for the field device FD1 can be created earlier with the assistance of a configuration tool, which accesses for creation of the pattern bitmap information for device integration of the field device FD1, especially a DTM (Device Type Manager). The creation the pattern bitmap can be performed, for example, earlier by the configuration tool implemented in the communication unit 14. After its creation, the pattern bitmap can be imported into the wireless adapter WA1 and stored therein.

The comparison is performed in the wireless adapter WA1 by comparing the individual bit locations of the status information bitmap with the corresponding bit locations of the pattern bitmap (compare "COMPARISON: EVALUATION REQUIRED?" in S4 in FIG. 2). If the comparison shows that the obtained, expanded status information need not be evaluated (compare "NO" at step S4 in FIG. 2), then the unit composed of field device and wireless adapter 2 is operated back in normal operation. If the comparison shows that the obtained, expanded status information should be evaluated (compare "YES" at step S4 in FIG. 2), then the status information bitmap is transmitted directly (after performing the comparison) to the superordinated communication unit CU (compare "TRANSMITTING STATUS INFO WA=>CU" at step S5 in FIG. 2). The transmitting of the status information bitmap occurs, in such case, in an event mode. The transmitting occurs, in such case, other than at a planned communication (which occurs, for example, to predetermined times) and is here triggered by the event that the obtained, expanded status information should be evaluated.

Deviating from normal operation, the wireless adapter WA1 also remains after transmission of the expanded status information for a predetermined length of time in an activated standby mode (compare "WA READY TO RECEIVE" at step S6 in FIG. 2). In the standby mode, communication with the wireless adapter is initiable by the superordinated communication unit CU. If such communication is initiated, then the wireless adapter WA1 is awakened and communication with the superordinated communication unit CU and/or with the connected field device FD1 can take place. Accordingly, during the predetermined length of time, an analysis and/or error removal can be performed for the field device FD1, wherein the communication occurs, in each case, via the wireless adapter WA1 (as well as the superordinated communication unit CU) (compare "NO" at step S7 "PREDETERMINED TIME ENDED?" in FIG. 2). After expiration of the predetermined length of time (compare "YES" at step S7 in FIG. 2), the unit composed of field device and wireless adapter 2 is operated back in normal operation.

In parallel therewith, that the wireless adapter WA1 remains ready to receive during the predetermined length of time, in the superordinated communication unit CU, the status information bitmap is made available for call by the configuration tool implemented in the communication unit 14 (compare "STATUS INFO. CU=>C-TOOL" at step S8 in FIG. 2). Furthermore, the superordinated communication unit CU sends a report to the configuration tool and/or to a user, depending on responsibility for analysis and/or error removal. The transmission of the report can occur, for example, per email, per SMS, per telegram via a wired network, etc. The configuration tool produces, at least for calling the status information bitmap, a communication connection with the superordinated communication unit CU and reads the status information bitmap out. The configuration tool has, furthermore, access to information for device integration (especially a DTM) of the field device FD1, so that it can perform an evaluating of the status information bitmap with the assistance of this device-specific knowledge (compare "EVALUATING STATUS INFO." at step S9 in FIG. 2).

The configuration tool initiates now a more extensive analysis and/or error removal (compare "ANALYSIS U/O ERROR REMOVAL" at step S10 in FIG. 2). This can especially occur with cooperation and/or direction of a responsible user. In such case, the configuration tool can especially query particular status information of the field device FD1 and/or perform parameter settings on the field device FD1. For performing the communication required for this, in the case of the present form of embodiment, a transparent communication channel is provided from the superordinated communication unit CU via the wireless adapter WA1 to the field device FD1. In this way, the configuration tool can communicate via the transparent communication channel directly with the field device FD1 according to the respective fieldbus protocol (here: HART® protocol). Such communication is at least possible during the predetermined length of time, during which the wireless adapter WA1 remains correspondingly activated. On a display 14 of the communication unit, in which the configuration tool is implemented, a user is shown corresponding information (compare "DISPLAY FOR USER" at step S10 in FIG. 2). Especially, a user is displayed information relative to an error arisen in the field device FD1 and/or proposals for next measures to be undertaken, etc.

The present invention is not limited to the form of embodiment explained with reference to the figures. For example, it can alternatively be provided that the pattern bitmap is stored in the superordinated communication unit and the comparison is performed in the superordinated communication unit. In this case, the expanded status information is always transmitted from the wireless adapter to the superordinated communication unit. The wireless adapter remains after the transmission preferably sufficiently activated that communication with the same is initiable from the superordinated communication unit and it can be informed concerning the additional course of the procedure. The comparison is performed in the superordinated communication unit. If the comparison shows that the expanded status information is to be evaluated, then the additional steps can be performed correspondingly as in the case of the explained form of embodiment (after transmission of the expanded status information to the superordinated communication unit CU). If the comparison shows that the expanded status information is not to be evaluated, then the wireless adapter is told by the superordinated communication unit that it can change back to normal operation, and, in given cases, turn off.

In the case of the explained form of embodiment, the field device is formed by a sensor. Alternatively, it can also be formed by an actuator. A case of application would be, for example, that the wireless adapter connected to the actuator, in normal operation, at first, predetermined times, queries basic status information from the actuator and at second, predetermined times wirelessly transmits collected data to the superordinated communication unit. If, in such case, a status change of the actuator is detected, then the additional steps can be correspondingly executed.

The invention claimed is:

1. A method for operating a system having a field device, a wireless adapter in wired communication connection with the field device, and a superordinated communication unit, which is in wireless communication connection with the wireless adapter, comprising the steps of:
   monitoring in the wireless adapter whether, in the context of communication with the field device, a status change of the field device is being reported;
   event controlled querying of expanded status information of the field device by the wireless adapted, in case a status change has been reported; and
   event controlled transmitting of the expanded status information from the wireless adapter to the superordinated communication unit and providing this expanded status information through the superordinated communication unit to an evaluation tool only when comparison of the expanded status information with a status pattern adapted specifically for this field device shows that the relevant, expanded status information should be evaluated, wherein:
   the comparison is performed in a communication unit participated in the communication between the wireless adapter and the superordinated communication unit.

2. The method as claimed in claim 1, wherein:
   it is determined in the status pattern for the different pieces of expanded status information providable by the associated field device (FD1; FD2; FD3), in each case, whether such should be evaluated or not.

3. The method as claimed in claim 1, wherein:
   the information required for a configuration tool for creation of a status pattern associated with the field device are contained in information for device integration of the field device, especially in a device description and/or in a device driver of the field device.

4. The method as claimed in claim 1, wherein:
   the expanded status information is provided by the field device in the form of a status information bitmap; occupation of the bit locations of the status information bitmap determines the content of the expanded status information transmitted, in each case, the status pattern is formed by a corresponding pattern bitmap, and, in the case of the comparison, the status information bitmap is compared with the pattern bitmap.

5. The method as claimed in claim 1, wherein:
   the field device is supplied with electric power by the wireless adapter.

6. The method as claimed in claim 1, wherein:
   in normal operation, communication between the field device and the wireless adapter is performed at first, predetermined times, and transmission of data relative to the field device between the wireless adapter and the superordinated communication unit is performed wirelessly at second, predetermined times, and, in normal operation, the wireless adapter is switched off at times when it is performing no communication.

7. The method as claimed in claim 1, wherein:
   the wireless adapter, after the step of transmitting the expanded status information, for a predetermined length of time remains at least sufficiently activated that communication with the same is initiable by the superordinated communication unit.

8. The method as claimed in claim 1, further comprising a step, which is performed especially after said step of transmitting the expanded status information:
   providing a transparent communication channel from the superordinated communication unit via the wireless adapter to the field device, so that via the transparent communication channel communication is performable directly with the field device.

9. The method as claimed in claim 1, further comprising the step, which is performed by the superordinated communication unit after obtaining the expanded status information:
   transmitting a report to the evaluation tool, by which expanded status information of the field device is evaluatable.

10. The method as claimed in claim 1, wherein:
    the evaluation tool is embodied in such a manner that it applies information for device integration of the field device, especially a device description and/or a device driver of the field device, in order to evaluate expanded status information of the field device.

11. The method as claimed in claim 1, wherein:
    the comparison is performed in the wireless adapter.

12. The method as claimed in claim 1, wherein:
    the comparison is performed in the superordinated communication unit.

13. The method as claimed in claim 1, wherein:
    the wireless communication connection between the wireless adapter and the superordinated communication unit extends at least partially via a wireless long distance transmission network.

14. The method as claimed in claim 1, wherein:
    there is implemented in the superordinated communication unit a server, by which data relative to a plurality of field devices, especially a plurality of field devices of different users, are manageable and providable to corresponding applications.

15. A wireless adapter, to which one field device is connectable and brought into wired communication connection therewith, wherein wireless communication is performable by the wireless adapter and wherein an electronics of the wireless adapter is embodied in such a manner, that:

in use, it can be monitored whether, in the context of communication with the connected field device a status change of the field device is being reported;

in case a status change has been reported, expanded status information can be queried event-controlled from the connected field device;

a comparison of the expanded status information with a status pattern adapted specifically for the connected field device and storable in the wireless adapter can be performed and therefrom determined whether the relevant, expanded status information should be evaluated; and the expanded status information is transmitted by the wireless adapter wirelessly to a communication unit in communication connection with the wireless adapter only when the comparison performed shows that the expanded status information should be evaluated.

* * * * *